(12) United States Patent
Le et al.

(10) Patent No.: US 6,272,605 B1
(45) Date of Patent: Aug. 7, 2001

(54) SYSTEM USING PRIORITY DATA OF A HOST RECALL REQUEST TO DETERMINE WHETHER TO RELEASE NON-VOLATILE STORAGE WITH ANOTHER HOST BEFORE PROCESSING FURTHER RECALL REQUESTS

(75) Inventors: Cuong Minh Le; Jerry Wayne Pence, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/088,785

(22) Filed: Jun. 1, 1998

(51) Int. Cl.[7] .................................................. G06F 12/00
(52) U.S. Cl. ......................... 711/151; 364/200; 709/213; 709/214
(58) Field of Search ...................................... 711/111, 151, 711/158, 147; 364/200, 650, 425; 710/116, 40, 39, 44, 74, 23, 1; 709/213, 214, 219, 226, 229, 234, 217

(56) References Cited

U.S. PATENT DOCUMENTS

| | | | |
|---|---|---|---|
| 4,400,771 | * 8/1983 | Suzuki et al. | 364/200 |
| 4,638,424 | * 1/1987 | Beglin et al. | 364/200 |
| 4,771,375 | 9/1988 | Beglin et al. . | |
| 5,239,649 | * 8/1993 | McBride et al. | 395/650 |
| 5,325,505 | * 6/1994 | Hoffecker et al. | 395/425 |
| 5,440,686 | 8/1995 | Dahman et al. . | |
| 5,469,560 | 11/1995 | Beglin . | |
| 5,522,090 | 5/1996 | Tanaka et al. . | |
| 5,537,585 | 7/1996 | Blickenstaff et al. . | |
| 5,617,575 | * 4/1997 | Sakakibara et al. | 395/800 |
| 6,021,476 | * 2/2000 | Segars | 711/63 |

OTHER PUBLICATIONS

Bittihoffer And Pence, Preserving Tape Mounts, IBM Technical Disclosure Bulletin, vol. 26, No. 3A, Aug. 1983.

DFSMShsm Storage Administration Guide, MVS Version 1 Release, Document No. SH21–1076–02, Program No. 5695–DF1, File No. S370–30 (selected portions).

IBM Corporation, DFSMS/MVS: System–Managed Storage and Tape Mount Management, http://www.storage.ibm.com/software/sms/tmm.htm.

* cited by examiner

Primary Examiner—Le Hien Luu
Assistant Examiner—Farzaneh Farahi
(74) Attorney, Agent, or Firm—David W. Victor; Konrad Raynes & Victor

(57) ABSTRACT

Disclosed is a system for handling recall requests for data maintained in a storage device accessible to multiple systems. Initially, a storage device is allocated to the first host system to process recall requests in a recall queue including a plurality of recall requests. A second host recall request is initiated with the second host system to recall data from the storage device. The second host system determines whether the storage device is allocated to the first host system. If so, the second host systems stores priority data in a common or shared data structure indicating a priority of the second host recall request after determining that the storage device is allocated to the first host system. The first host system then conditionally releases the storage device before processing all the recall requests needing the subject tape in its queue to make the storage device available if the priority in the common data structure is higher than its own highest priority request. The second host system retries the second host recall request after the first host system releases the storage device. The second host system then determines whether the storage device is available and whether the highest priority second host recall request is greater than or equal to the priority data indicated in the data structure when retrying the second host recall request. The storage device is allocated to the second host system to process the second host recall request after determining that the storage device is available and that the priority of the second host recall request is greater than or equal to the priority data indicated in the data structure.

32 Claims, 4 Drawing Sheets

SYSTEM USING PRIORITY DATA OF A HOST RECALL REQUEST TO DETERMINE WHETHER TO RELEASE NON-VOLATILE STORAGE WITH ANOTHER HOST BEFORE PROCESSING FURTHER RECALL REQUESTS

This application is related to the commonly assigned and co-pending application entitled "Contention Handling For Task Requests To Storage Devices Within A Host System," to Jerry Pence, application No. 09/088,347, filed on the same date herewith, and which application is incorporated herein by reference in its entirety.

BACKGROUND OF THE INVENTION

1. Field of the Invention

The present invention relates to a method and system for handling multiple, overlapping access requests to a storage device from multiple host systems.

2. Description of the Related Art

In a hierarchical storage management system, data is stored in different types of storage devices depending upon the frequency of usage of the data. For instance, a system may include multiple storage media types to store data having different usage patterns and likelihoods of access. More frequently used data may be stored on direct access storage devices (DASD) comprised of high-performance rapid access storage devices, such as hard disk drives. Such readily accessible data is sometimes referred to as level zero volumes. Less frequently used data may be archived on slower and less expensive, demountable storage media, such as optical disks, magnetic tape cartridges, etc. Such archive volumes are referred to as level two storage.

A hierarchical storage management system provides mechanisms for migrating less frequently used data from level 0 to level 2 media. This provides more space for more frequently used data sets on the level 0 storage devices. If a host system attempts to access data sets maintained in level 2 storage, then software implemented in the host system would automatically cause the recall of the requested data from the level 2 to level 0 storage devices. The level 0 storage devices further store control data sets, an inventory, that the host systems utilize to access data from the storage devices.

Two common functions initiated by host systems in hierarchical storage management systems include migration and recall. Migration involves the movement of data from level 0 to level 2 storage to make more room for more frequently accessed data on the primary level 0 storage devices. If a host system attempts to access a data set that has been migrated to level 2 storage, then the recall function would be initiated to move the requested data sets from the level 2 storage to level 0.

International Business Machines Corporation (IBM®) provides the Data Facilities Storage Management Subsystem (DFSMS®) software which is included in the IBM MVS/ESA™ and OS/390® operating systems. This software allows host systems to perform hierarchical storage management operations, such as migration and recall. DFSMS and OS/390 are registered trademarks of IBM, and MVS/ESA is a trademark of IBM. The operation and implementation of the DFSMS system are described in IBM publications "DFSMS/MVS VIR3 General Information," IBM document no. GC26-4900-04 (IBM Copyright, 1980, 1995) and "DFSMS/MVS VIR3 DFSMShsm Storage Administration Guide," IBM document no. SH21-1076-02 (IBM Copyright 1984, 1995), which publications are incorporated herein by reference in their entirety. U.S. Pat. Nos. 4,638,424 and 4,771,375, assigned to IBM and incorporated herein by reference in their entirety, describe how contentions between multiple hosts initiating migration and recall requests to the same volume are handled.

In some systems, if a host system initiates a recall request to a volume that is already allocated to a second host system, an inventory control record maintained in the level 0 DASD indicates that a recall task needs the volume. In the DFSMS system, the inventory record for a volume is referred to as a Migration Control Volume (MCV). The recalling task, initiated by the recalling host's DFSMS software, then periodically retries to access the allocated device until the desired volume is available or until a preset number of retries of the recall request fails. After the host performing the migration completes migrating the current data set to the volume in contention, the migration task releases the volume and continues migrating data sets to another tape.

Similarly, when one host attempts a recall from a volume allocated to another host that is performing recall requests, the host system repeats the recall requests every couple of minutes. After a predetermined number of retries, the operator would be given the option to fail the recall or perform the retry sequence again. The host system processing recall requests processes all recall tasks generated by that host system before demounting the tape to allow another host system to recall data from the tape cartridge.

The storage capacity of tape cartridges and other typical level 2 storage devices has increased significantly, thereby allowing an ever increasing number of data sets to be maintained on any given tape. One effect of the increase of storage capacity is that the probability that a host system will attempt a recall from a tape cartridge that is allocated to another host system has significantly increased due to the increased number of data sets stored on the tape cartridge. Moreover, software programs that improve storage capacity utilization of tapes further increase the probability that multiple hosts will attempt recall requests of data on the same cartridge because more data sets are stored on each tape cartridge. For these reasons, the expected "wait time" a host system must wait for another host system to perform all its existing recall requests for a specific tape increases because the probability the host system will have multiple recall requests on the allocated tape cartridge has increased.

A problem arises if a host system initiates higher priority recalls than the recalls being processed by the host system currently using the tape. The host system using the tape would complete all its queued recalls having the lower priority before releasing the tape and making the tape available to be allocated to the other host system with the higher priority recalls. Accordingly, high priority recall requests from a host system may be delayed significantly until the current host system completes processing all its lower priority requests.

SUMMARY OF THE PREFERRED EMBODIMENTS

To overcome the limitations in the prior art described above, the present invention discloses a system for handling recall requests for data maintained in a storage device from multiple host systems. Initially, a storage device is allocated to a first host system to process recall requests in a recall queue including a plurality of recall requests. A second host recall request is initiated with a second host system to recall data from the storage device. The second host system determines whether the storage device is allocated to the first host system. If so, the second host system stores priority data in a data structure indicating a priority of the second host recall request after determining that the storage device is allocated to the first host system. The second host system retries the second host recall request at a later time. The first host system then releases the storage device before processing all the recall requests in the recall queue to make the storage device available.

In further embodiments, the second host system determines whether the storage device is available and whether the priority of the second host recall request is greater than or equal to the priority data already indicated in the data structure when retrying the second host recall request. The first host system releases the tape if its next recall request has lesser priority than the recall request indicated in the data structure. The storage device is then allocated to the second host system to process the second host recall request after determining that the storage device is available.

Preferred embodiments provide a system for handling contentious recall requests among multiple host systems to allow higher priority recall requests from different host systems to be considered before the host system to which the storage device is allocated completes all resident recall requests. This allows a host system currently using the storage device to relinquish the storage device to another host system to service higher priority recall requests.

Preferred embodiments include preference to the host system having the highest priority request when more than one requesting host system has a need for the tape mounted on the host currently using the tape. Moreover, preferred embodiments provide protection from a preferred host with a higher priority request that is not soon available due to stopping or being slow to respond. When a higher priority host is slow to respond, preference may be provided to a host system of lower priority that is ready to proceed.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
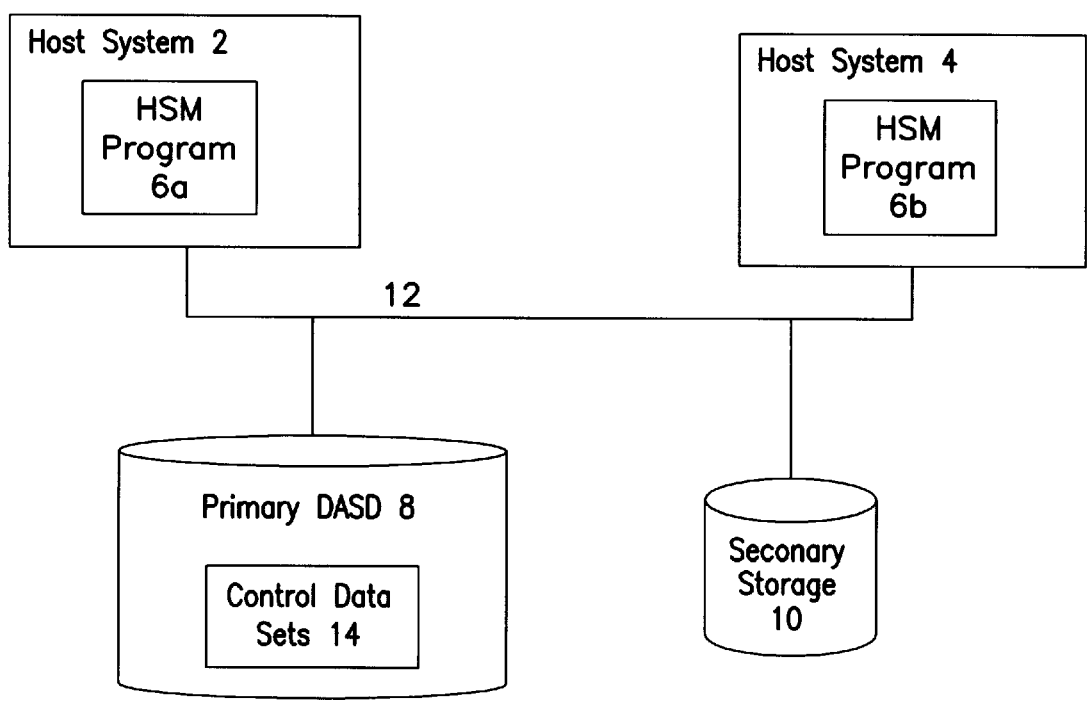
FIG. 1 is a block diagram illustrating a software and hardware environment in which preferred embodiments of the present invention are implemented.

FIG. 1 illustrates the hardware and software environment in which preferred embodiments of the present invention are implemented. Host systems 2, 4 include hierarchical storage management (HSM) programs 6a, b, respectively. A primary DASD 8 provides storage of more frequently used volumes and data sets, i.e., level 0 volumes, for access by the host systems 2, 4. In preferred embodiments, the primary DASD 8 is comprised of relatively high-performance rapid access storage devices, such as a group of hard disk drives. A secondary storage system 10 provides storage of less frequently used data, i.e., level 2 volumes. In preferred embodiments, the secondary storage 10 utilizes slower and less expensive storage media than that used for the primary DASD 8, e.g., optical disks, magnetic tape cartridges, etc. Typically, the secondary storage 10 archives less frequently used data from the primary DASD 8.

In preferred embodiments, the secondary storage 10 may be comprised of an automated tape library (ATL) which includes multiple tape drives and numerous tape cartridges that may be mounted into the tape drives automatically using a robotic arm. In such case, the ATL may include any suitable tape drives known in the art, e.g., the Magstar 3590 tape drives and Magstar cartridges; the IBM 3490E tape drive and CST and ECCST cartridges; and the IBM 3480 tape drive and cartridges, etc. Alternatively, the secondary storage 10 may be a manual tape library in which a tape operator manually mounts tape cartridges into the secondary storage 10 tape drives.

In alternative embodiments, any alternative non-volatile storage media and systems known in the art may be used for the primary DASD 8 and secondary storage 10, including, optical disks, holographic units, DVD, CD-ROM, non-volatile RAM, etc.

Data is transferred between the host systems 2, 4 and primary DASD 8 and secondary storage 10 via a network 12. The network line 12 may be comprised of any network technology known in the art, such as LAN, WAN, SNA networks, TCP/IP, ESCON®, the Internet, etc. ESCON is a registered trademark of IBM.

The host systems 2, 4 may be any computer system, such as a mainframe, personal computer, workstation, etc., including an operating system such as WINDOWS®, AIX®, UNIXS, ® MVSTM™, etc. AIX is a registered trademark of IBM; MVS is a trademark of IBM; WINDOWS is a registered trademark of Microsoft Corporation; and UNIX is a registered trademark licensed by the X/Open Company LTD. As mentioned, the host systems 2, 4 include HSM programs 6a, b that include the functionality of HSM type programs known in the art that manage the transfer of data between storage systems, such as the IBM DFSMS software discussed above, which is implemented in the IBM MVS operating system. In addition to including known HSM functions, such as migration and recall, the HSM programs 6a, b would further include additional program instructions and logic to perform the operations of the preferred embodiments of the present invention. The HSM program 6a, b may be implemented within the operating system of the host systems 2, 4 or as separate, installed application programs.

The primary DASD 8 further stores control data sets 14 that the HSM programs 6a, b in the host systems 2, 4 access and update when accessing data sets within the primary DASD 8 and the secondary storage 10. Controllers or storage subsystems receive commands from the HSM program 6a, b in the host systems 2, 4 and perform the operations requested by the HSM programs 6a, b, such as migration and recall, to transfer data among the primary DASD 8, secondary storage 10, and the host systems 2, 4. In preferred embodiments, the storage controllers within the primary DASD 8 and secondary storage 10 can simultaneously process numerous input/output requests from the host systems 2, 4 and any other attached system directed toward the storage units 8, 10. Moreover, the HSM programs 6a, b in the host systems 2, 4 may be capable of multitasking, simultaneously executing numerous input/output operations, and simultaneously transmitting multiple I/O requests to the primary DASD 8 and secondary storage 10 to execute.

Recall, Request Priority, and Data Structures

Figure 2:
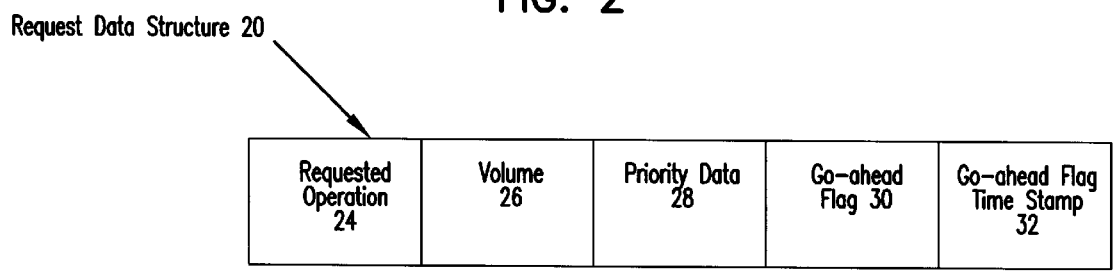
FIG. 2 illustrates a data structure for a recall request in accordance with preferred embodiments of the present invention.

A host system 2, 4 initiating a request for a data set from the secondary storage 10 builds a request data structure 20, illustrated in FIG. 2, to execute the requested task, e.g., recall, migration, recycling, and parameter functions needed to accomplish the requested task. In DFSMS, the request data structure is referred to as a management work element (MWE), which is the data structure the host systems 2, 4 generate to execute a specific request, such as recall. This request data structure 20 may include the following information fields: a requested operation field 24 indicating the operation to be performed, e.g., recall, migration, etc.; a volume field 26 indicating the volume subject to the operation identified in field 24; priority data 28 indicating the priority of the request; a "go-ahead" flag 30, such as a addressable bit location. The flag bit 30 indicates whether the recall request represented by the data structure 20 should defer to another host or procedure regardless of its priority. The request data structure may further include a time stamp field 32 indicating a time stamp of the entry associated with the setting of the go-ahead flag. In preferred embodiments, the request data structure 20 is used locally by the host system to determine whether or not to perform this recall request now.

Figure 3:
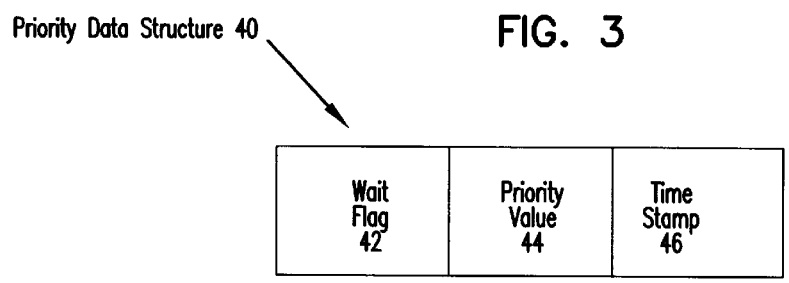
FIG. 3 illustrates a data structure to indicate the priority of a recall request in accordance with preferred embodiments of the present invention.

FIG. 3 illustrates a preferred embodiment of a priority data structure 40, which includes data fields indicating a priority of a task initiated by a host system 2, 4. The priority data structure 40 of FIG. 3 may be the priority data 28 maintained in the request data structure 20. The host systems 2, 4 would generate the priority data structure 40 when generating a recall request to a volume indicating the priority of the data set subject to the recall. A wait flag 42 field indicates whether the application originating the request needs the recalled data to proceed. In preferred embodiments, the wait flag 42 field is comprised of a bit location. A binary zero may indicate that the request is "no wait" and a binary one may indicate the request is "wait." "Wait" means that the requesting application needs the requested data before proceeding with program execution, i.e., the application must wait for the data. "No wait" means the application does not need the data to proceed and can receive the data at some later time, i.e., it does not have to wait.

A priority value field 44 may indicate a priority value, such as a number from 1–100, indicating the priority of the recall task. For instance, a database application program request for data may have a very high priority, whereas a batch processing task requesting data may have a lower priority, and request from users may have an even lower priority. The user may program priority values based on the source of the request, e.g., database, batch job or user request. A time stamp field 46 indicates the time at which the recall request was initiated. In preferred embodiments, the HSM programs 6a, b generate the priority data included in the priority data structure 40. The different fields 42, 44, 46 in the priority data structure 40 may have different priority. For instance, the priority value 44 and time stamp 46 fields may only be checked if the wait flag 42 field for compared data structures 40 are the same. Likewise, the time stamp 46 field may only be compared if the wait flag 42 and priority value 44 for compared priority data structures 40 are identical.

In this way, the priority data structure 40 provides multiple levels of information describing the relative priority of a task according to different criteria. In alternative embodiments, the priority data structure may include additional or fewer fields than the data structure 20 shown in FIG. 2.

Figure 4:
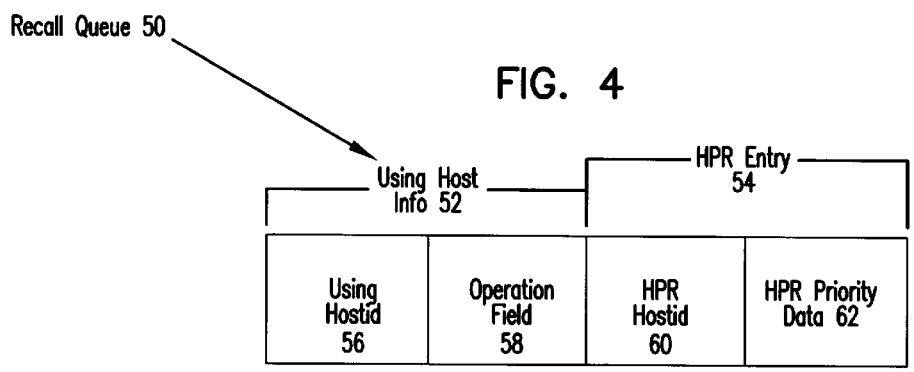
FIG. 4 illustrates a data structure of an inventory record including information on the status of a volume with respect to recall requests in accordance with preferred embodiments of the present invention.

FIG. 4 illustrates a preferred embodiment of an inventory record 50 including information on the host system currently recalling data from the tape, referred to as the using host, and a highest priority recall (HPR) entry 54 including information on a recall request from a host system having the highest priority request (HPR) of any attempted recall requests from other hosts while the using host was performing recalls on the tape. The using "hostid" field 56 includes host identifier information for the host system currently using the tape and an operation field 58 indicating the operation the using host is performing, e.g., recall, migration, etc. The HPR hostid field 60 indicates the hostid of the host attempting the highest known priority recall request (HPR) while the tape is allocated to the using host and the HPR priority data field 62 includes the priority data structure 40 of the HPR request. In preferred embodiments, the inventory records 50 are maintained in the primary DASD 8 as part of the control data sets 14 and accessible by the host systems 2, 4.

Whenever a requesting host system attempts a recall and the tape is in use by recall in another host, the requesting host examines the HPR priority data 62 in the inventory record 50. The requesting host would then insert its hostid into the HPR hostid data field 60 and its priority data into the HPR priority data field 62 if the priority data of the requesting host is greater than the current HPR priority data 62. A requesting host will only replace the HPR entry if the recall the requesting host is now attempting to start has higher priority than the current priority in the HPR entry 54. In this way, the inventory record 50 maintains information on the highest priority recall attempt toward the tape while the tape was subject to recall request processing from the using host system.

In addition, the using host may maintain a queue of recall operations for the tape being used. For instance, a host system 2, 4 may have a queue of multiple recall requests for different data sets from the tape cartridge currently being used. In preferred embodiments, the using host orders recall requests in the queue according to their priority, as indicated in the priority data structure 40. Each queued request may include a delay time. After the using host system performs recall requests on the specified storage tape for a specified time and the HPR priority data 62 for the specific tape being used contains higher priority than any entries of the using host, then the using host system will demount the tape to make it available to other host systems' recall requests. The using host will further delay initiating the next recall request for the subject tape in the queue until the expiration of a delay time. In preferred embodiments, the delay time for the using host to retry recall requests in the queue is longer than the delay time of another requesting host retrying recall requests. This provides requesting hosts the opportunity to retry recall requests before the using host attempts the next recall request for the subject tape in its queue. In this way, the using host can use a tape for only a limited amount of time before it is subject to making the tape available for other hosts having recall requests of higher priority than the requests in the queue of the using host.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Contention Handling for Recall Requests Among Multiple Hosts

Figure 5:
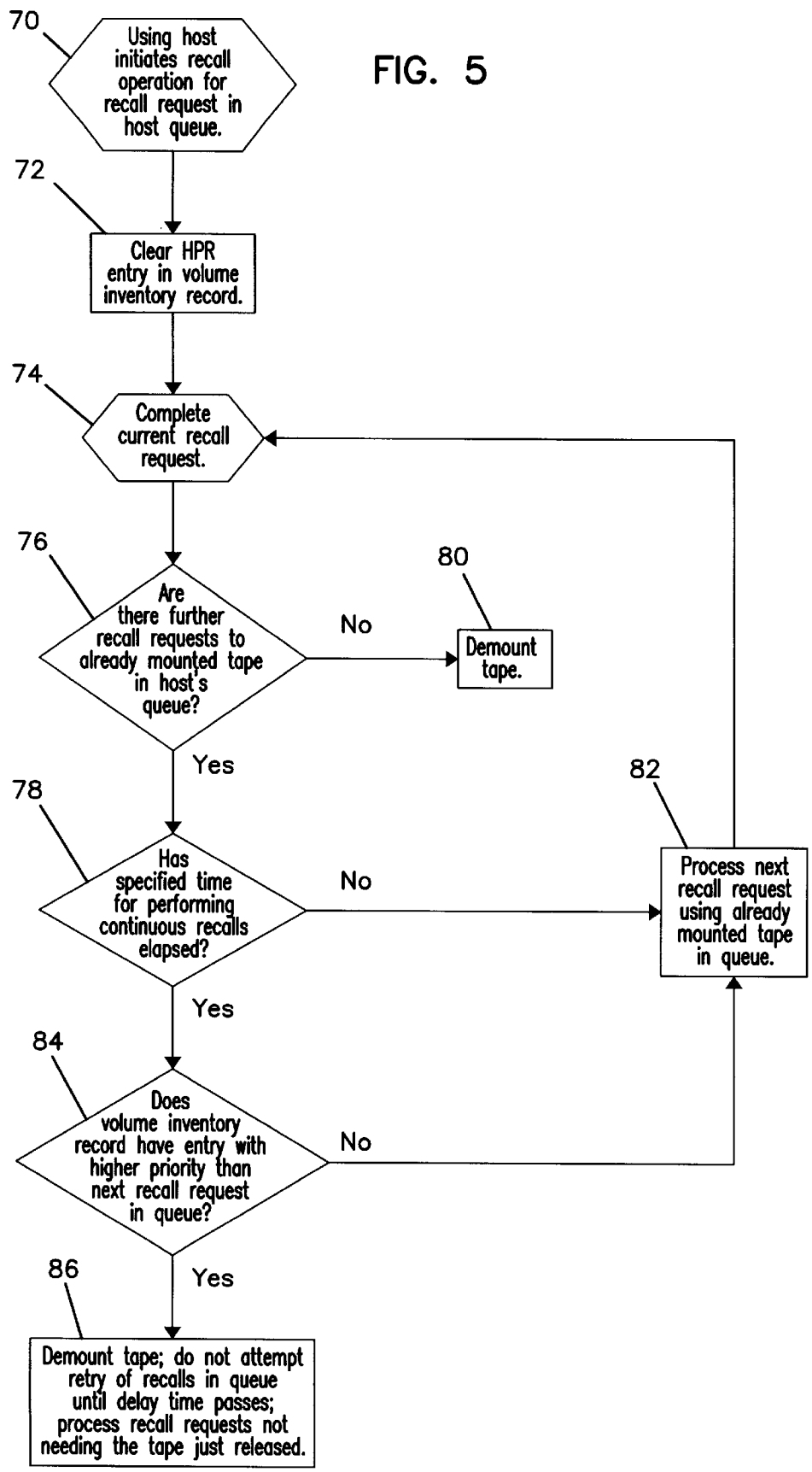
FIG. 5 is a flowchart showing logic for a host system that is using the storage device for recall requests in accordance with preferred embodiments of the present invention.
Figure 6:
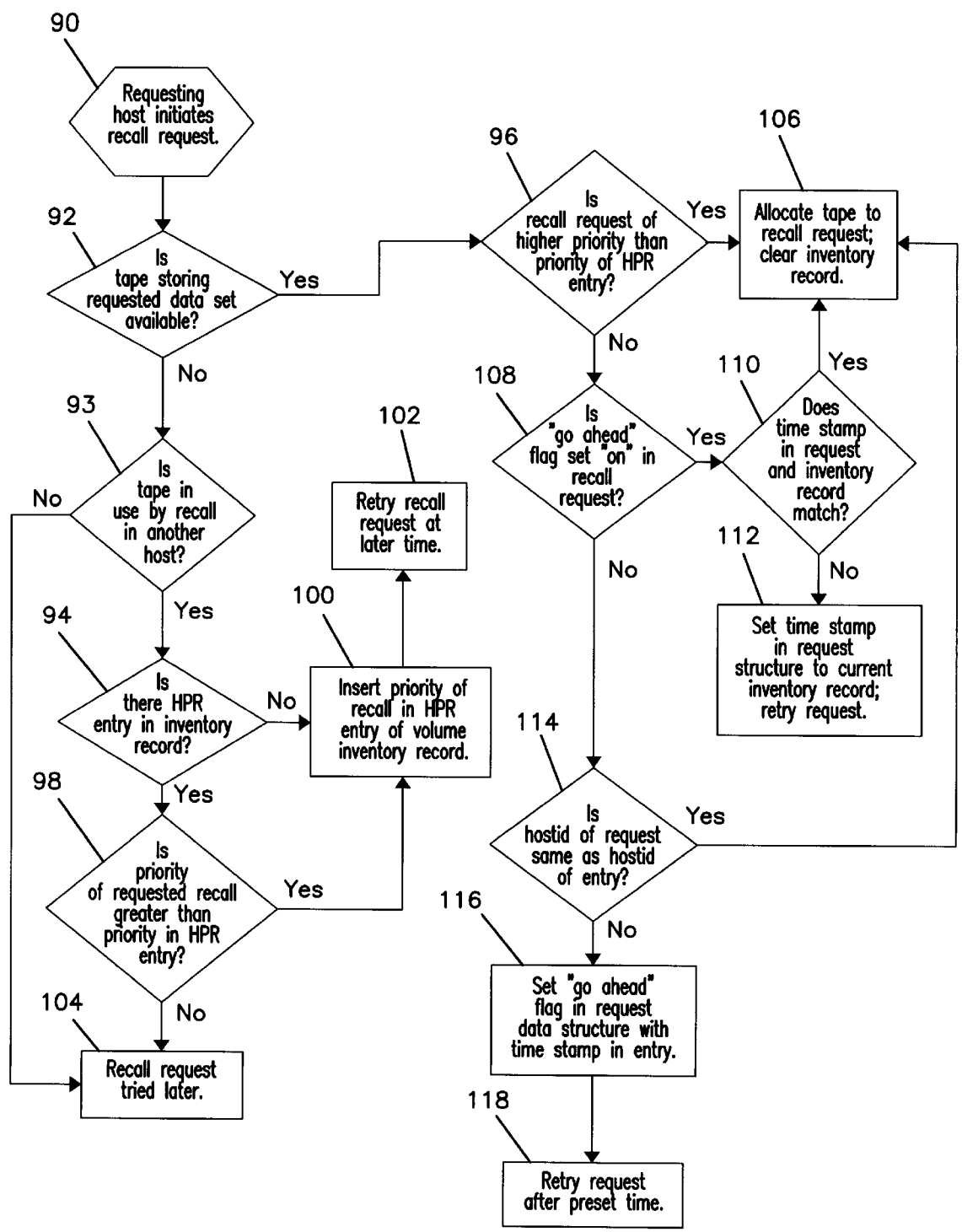
FIG. 6 is a flowchart showing logic for a host system to process recall requests in accordance with preferred embodiments of the present invention.

FIGS. 5 and 6 are flowcharts that illustrate preferred logic implemented in the software of the HSM programs 6a, b to handle contentions of multiple recall requests from different hosts. Those skilled in the art will recognize that this logic is provided for illustrative purposes only and that different logic may be used to accomplish the same results.

FIG. 5 illustrates logic implemented by the using host currently processing recall requests on a tape cartridge in the secondary storage 10. Control begins at block 70 which represents the using host initiating a recall operation for the highest priority recall request in the queue local to the using host. Control proceeds to block 72 which represents the using host clearing the HPR entry 54 in the inventory record 50. Control then transfers to block 74 which represents the using host completing the current recall request from the queue. After completing the current recall request, control transfers to block 76 which is a decision block representing the using host determining whether there are any further recall requests in the using host's queue. If so, control transfers to block 78; otherwise, control transfers to block 80 which represents the using host demounting the tape and making the tape available for recall requests from other hosts.

If there are further recall requests in the queue, at block 78, the using host determines if the specified time for performing continuous recalls has passed. After beginning processing recall requests, the using host may execute recall requests in its queue for this specified time, uninterrupted from recall requests by other hosts. This provides a minimum time during which a using host may service recall requests in its own queue regardless of the priority of recall requests from other hosts. If the time for continuous recalls has not elapsed, then control transfers to blocks 82 and 74 et seq., which represents the using host proceeding to the next highest priority recall request for the subject tape in the queue. Otherwise, if the time has elapsed, then control transfers to block 84 which represents the using host determining whether a recall request needing this tape from another host had a higher priority, as indicated in the HPR priority data field 62, than the priority of the next recall request in the using host's queue. If so, control transfers to block 86; otherwise, control transfers back to block 82 et seq. which represents the using host processing the next recall request in the queue. Block 86 represents the using host demounting the tape and making the tape available for recall requests from other host systems.

In preferred embodiments, the using host will not retry the existing recall requests in the queue for a delay time so as to allow higher priority recall requests from other host systems to access the tape. As discussed, the retry time for recall requests from other hosts is shorter than the delay time for the using host to retry recall requests in its queue. This allows retries from requesting hosts to have an opportunity to access the tape before the using host remounts it. After demounting the tape, the using host will process the highest priority request in its queue that is not deferred due to a resource not being available.

FIG. 6 illustrates logic implemented by a requesting host that generates a request data structure 20 and attempts a recall request on a tape currently in use by the using host. Control begins at block 90 which represents the requesting host generating and initiating a recall request, including the request data structure 20. Control transfers to block 92 which represents the requesting host examining the using host info 52 in the inventory record 50 to determine whether the subject tape is currently available for this recall in the requesting host. If so, control transfers to block 93; otherwise, control transfers to block 96. Block 93 represents the requesting host determining whether the tape is in use by recall in another host. If so, then control transfers to block 94. Otherwise, if the tape is not immediately available and not in use by recall in another host, control transfers to block 104 which represents the requesting host retrying the recall request later.

If the tape is currently in use by recall at another host, then at block 94, the requesting host determines whether there is an HPR entry 54 in the inventory record 50. If so, control transfers to block 98; otherwise, control transfers to block 100. If there is no HPR entry 54, then at block 100, the requesting host inserts the priority data of the requested recall from the priority data field 28 into the HPR entry 54 of the inventory record 50. The requesting host adds both its hostid to the HPR hostid field 60 and the priority data 28 into the HPR priority data 62 field. Control then transfers to block 102 which represents the requesting host retrying the recall request after a predetermined time. The requesting host may record the time of the failed recall request in a field (not shown) in the requesting data structure 20. If there is an HPR entry 54, then control transfers to block 98 which represents the requesting host determining whether the priority indicated in the priority data field 28 in the request data structure 20 is greater than the priority indicated in the HPR priority data field 62. If the priority of the requested recall is greater, then control transfers to block 100 et seq. to insert the hostid field 60 and the priority data 28 in the request data structure 20 into the HPR priority data field 62 in the inventory record 50. Otherwise, control transfers to block 104, which represents the requesting host attempting the recall at a later time without updating the HPR entry 54 in the inventory record 50.

As discussed, when the priority data includes the fields described in FIG. 3, the requesting host would first compare the wait flag fields 42. If the wait flag 42 was the same for the requesting recall and the HPR entry 54, then the requesting host would compare the priority value 44 of the request with that in the HPR priority data field 62. If the priority values 44 are identical, then the requesting host would compare the time stamp 46 priority value. At any time, if the priority data 28 of the request is higher than the priority data 62 in the HPR entry 54 for the wait flag 42, priority value 44 or time stamp 46, then control transfers to block 100 to insert the hostid and priority data 28 in the request data structure 20 into the HPR entry fields 60, 62. Similarly, at any time, if the priority data 28 of the requested recall is less than the HPR priority data 62 in the inventory record 54 for the wait flag 42, priority value 44 or time stamp 46, then control transfers to block 98 to try the recall request later.

If, at block 92, the data set that is the subject of a recall request is included in a tape that is available, then control would proceed to block 96 to determine whether the requesting host should perform this recall. Block 96 represents the requesting host comparing the priority data 28 in the request data structure 20 to the HPR priority data 62 in the inventory record 50. If the request has higher priority, then control transfers to block 106; otherwise, control transfers to block 108. Block 106 represents the requesting host mounting the tape to perform recall requests and clearing the HPR entry 54 in the inventory record 50 to accumulate the highest priority recall request from another host. If the recall request has lower priority, then control transfers to block 108 which represents the requesting host determining if the "go ahead" flag 30 is set. If the flag is set "on," then control transfers to block 110 to determine if the time stamp for the flag 32 is identical to time stamp indicated in the HPR priority data 62 of the inventory record. If the time stamps match, then control transfers to block 106 to mount the tape and process the request because this host has delayed long enough to give the host having the highest priority request a chance to take the tape. Otherwise, control transfers to block 112, which represents the requesting host setting the time stamp field 32 to the value of the time stamp in the priority data 62 of the inventory record 50.

If the go-ahead flag was set as "off," then control transfers to block 114, which represents the requesting host determining whether the hostid of the requesting host matches the HPR hostid 60 in the inventory record 50. If so, control transfers to block 106 to allocate the tape to the requesting host to process recall requests. Otherwise, control transfers to block 116 which represents the requesting host setting the "go-ahead" flag 30 to "on" and setting the go-ahead time stamp field 32 to a value in the HPR priority data 62.

The logic of FIG. 6 allows a second intervening host to recall over a lower priority first requesting host and, at the same time, allow the first requesting host to perform recalls should the second intervening host fail or be slow to respond. For instance, if a first requesting host attempts recall and finds the tape in use by recall at the using host, then, at blocks 100 and 102, the first requesting host inserts its priority and hostid data into the HPR entry record 54 and retries the recall at a later time. A second intervening requesting host having a higher priority than the first requesting host may then attempt a recall on the tape in use by the using host. In such case, at blocks 96, 100, and 102, the second requesting host would insert its priority and hostid data into the HPR entry record 54 and retry later. At this point, the using host completes use of the tape and makes the tape available. When the first requesting host retries recall on the now available tape, the first requesting host cannot proceed because there is a higher priority entry in the HPR entry 54. In such case, at block 108, the first requesting host sets the go-ahead flag 30 to on and the time stamp 32 to the current time stamp value in HPR priority data 62, and retries again later.

The second requesting host will perform its retry and start recalls on the tape as the tape is available and it has priority matching the priority in the HPR entry 54. If another host or the initial using host attempts recall while the second requesting host is using the tape, then such host will set the entry in the HPR entry 54. After the second requesting host makes the tape available and when the first requesting host retries, at blocks 108, 110, and 112, it will defer again even though its go-ahead flag 30 is on because the time stamp value 32 of the first requesting host is different than the time stamp in the HPR priority data 62 inserted by another intervening host. The first requesting host will set its time stamp 32 to the current time stamp value in the HPR priority data 62. Although, the first requesting host's recall effort has been delayed again to higher priority intervening requesting hosts, eventually the first requesting host will perform recall when there are no higher priority recall requests from intervening hosts.

Conclusion

This concludes the description of the preferred embodiments of the invention. The following describes some alternative embodiments for accomplishing the present invention.

In preferred embodiments, specific data structures, such as the request data structure, priority data structure, and inventory record were described as being generated by the HSM programs 6a, b within the host systems 2, 4. In alternative embodiments, these records could be generated by different processing units, such as storage subsystems managing the primary DASD 8 and secondary storage 10 or any other processing unit. Moreover, these data structures could include additional or fewer fields than shown in the preferred embodiments.

The logic of FIGS. 5 and 6 and other embodiments were described with respect to recall requests to a tape cartridge. However, those skilled in the art will appreciate that the preferred logic could apply to any type of non-volatile storage medium from which data is recalled. Moreover, the logic may also apply to other returns of data other than recall, such as recovery.

Preferred embodiments were described as being implemented in logic within HSM programs 6a, b. In alternative embodiments, functions described as being performed by the HSM programs 6a, b may be performed by logic within storage subsystems managing the primary DASD 8 and/or secondary storage 10.

In summary, preferred embodiments in accordance with the present invention disclose a system for handling recall requests for data maintained in a storage device from multiple host systems. Initially, a storage device is allocated to the first host system to process recall requests in a recall queue including a plurality of recall requests. A second host recall request is initiated with the second host system to recall data from the storage device. The second host system determines whether the storage device is allocated to the first host system. If so, the second host systems stores priority data in a data structure indicating a priority of the second host recall request after determining that the storage device is allocated to the first host system. The second host system retries the second host recall request at a later time. The first host system then releases the storage device before processing all the recall requests in the recall queue to make the storage device available.

The foregoing description of the preferred embodiments of the invention has been presented for the purposes of illustration and description. It is not intended to be exhaustive or to limit the invention to the precise form disclosed.

Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for handling recall requests for data maintained in a non-volatile storage device from multiple host systems, comprising:

allocating the non-volatile storage device to a first host system to process recall requests in a recall queue including a plurality of recall requests;

initiating a second host recall request with a second host system for data from the non-volatile storage device;

determining with the second host system whether the non-volatile storage device is allocated to the first host system;

storing priority data in a data structure with the second host system indicating a priority of the second host recall request after determining that the non-volatile storage device is allocated to the first host system;

retrying with the second host system the second host recall request at a later time; and using the stored priority data to determine whether to release the non-volatile storage device with the first host system before processing further recall requests in the recall queue to make the non-volatile storage device available.

2. The method of claim 1, wherein the stop of the first host system releasing the non-volatile storage device occurs after the first host system determines that a next recall request in the recall queue has lower priority than the priority data the second host system stored in the data structure.

3. The method of claim 1, further comprising the steps of:

determining with the second host system whether the non-volatile storage device is available and whether the priority of the second host recall request is greater than or equal to the priority data indicated in the data structure when retrying the second host recall request; and allocating the non-volatile storage device to the second host system to process the second host recall request after determining that the non-volatile storage device is available and that the priority of the second host recall request is greater than or equal to the priority data indicated in the data structure.

4. The method of claim 1, wherein the second host system stores the priority data in the data structure after comparing the priority data for the second host recall request with current priority data maintained in the data structure and determining that the priority of the second host recall request is higher than the current priority data maintained in the data structure.

5. The method of claim 1, wherein the first host system releases the non-volatile storage device after processing recall requests in the recall queue for a continuous period of time.

6. The method of claim 1, wherein the later time the second host system retries the second host recall request is a first period of time, further comprising the step of the first host system attempting a recall request in the recall queue after a second period of time from when the first host system released the non-volatile storage device, wherein the first period of time is less than the second period of time to allow the allocation of the non-volatile storage device to the second host system before the first host system attempts the recall request in the recall queue that would use the subject tape.

7. The method of claim 6, further comprising the steps of:

determining with the second host system whether a priority of the attempted recall request from the recall queue is greater than the priority indicated in the data structure; and allocating the non-volatile storage device to the second host system to process the attempted recall request after determining that priority of the attempted recall request from the recall queue is greater than the priority indicated in the data structure.

8. The method of claim 1, wherein the priority data includes a wait flag indicating whether an application program requesting the data that is the subject of the recall request needs the data in order to proceed, a priority value indicating a priority of the application program requesting the data, and a time stamp indicating when the recall request for the data was attempted, wherein the step of determining whether the priority data of a recall request is greater than or equal to the priority data stored in the data structure comprises the steps of determining whether the priority of the wait flag, priority value, and time stamp of the recall request is greater than or equal than that of the priority data stored in the data structure.

9. The method of claim 1, further including the steps of:

a third host system attempting a third host recall request before the second host system retries the second host recall request and before the first host system releases the non-volatile storage device;

storing priority data in the data structure with the third host system indicating a priority of the third host recall request after determining that the priority data in the data structure is lower priority than the priority of the third host recall request;

setting a flag associated with the second host recall request after deter that the priority of the second host recall request is less than the priority indicated in the data structure, wherein the flag is set when the non-volatile storage device is released;

retrying the second host recall request after setting the flag, wherein the second host retries the second host recall request before the third host system attempts to retry the third host recall request; and allocating the non-volatile storage device to the second host system to process the second host recall request after determining that the non-volatile storage device is available and that the flag is set.

10. The method of claim 9, wherein the step of setting the flag further comprises setting a value associated with the flag that is identical to a value in the priority data maintained in the data structure, and wherein the step of allocating the non-volatile storage device occurs after determining that the non-volatile storage device is available, the flag is set, and the value associated with the flag is identical to the value in the priority data maintained in the data structure.

11. A system for handling recall requests for data maintained in a non-volatile storage device from multiple host systems, comprising:

a first host system capable of communicating with the non-volatile storage device;

a second host system capable of communicating with the non-volatile storage device;

a first memory location for storing data for access by a storage management program being executed on the second host system, comprising a first data structure defining a second host recall request for data stored in the non-volatile storage device, wherein the first data structure includes priority data indicating a priority of the second host recall request;

a second memory location for storing data for access by a storage management program being executed on the first host system, comprising a second data structure defining a queue of recall requests for the non-volatile storage device; and a third memory location for storing data for access by storage management programs being executed on the first and second host systems comprising a third data structure indicating whether the non-volatile storage device is allocated to the first host system, wherein the second host system stores priority data in the third data structure indicating the priority of the second host recall request after determining that the non-volatile storage device is allocated to the first host system, wherein the second host system retries the second host recall request at a later time, and wherein the first host system uses the stored priority data in the third data structure to determine whether to release the non-volatile storage device before processing further recall requests indicated in the second data structure.

12. The system of claim 11, wherein the non-volatile storage device is a member of the set of non-volatile storage devices comprising magnetic tape units and optical disks.

13. The system of claim 11, wherein the first memory location is implemented in a memory device local to the second host system, wherein the second memory location is implemented in a memory device local to the first host system, and wherein the third memory location is implemented in a memory device accessible to both the first and second host systems.

14. The system of claim 11, wherein the second host system stores the priority data in the third data structure after comparing the priority data for the second host recall request with current priority data maintained in the third data structure and determining that the priority of the second host recall request is higher than the current priority data maintained in the third data structure.

15. The system of claim 11, wherein the priority data in the first and third data structures includes a wait flag indicating whether an application program requesting the data that is the subject of the recall request needs the data in order to proceed, a priority value indicating a priority of the application program requesting the data, and a time stamp indicating when the recall request for the data was generated, wherein the second host system determines whether the priority of a recall request indicated in the first data structure is greater than or equal to the priority indicated in the third data structure by determining whether the priority of the wait flag, priority value, and time stamp of the recall request as indicated in the first data structure is greater than or equal the wait flag, priority value, and time stamp priority data indicated in the third data structure.

16. The system of claim 11, wherein a third host system stores priority data in the third data structure indicating a priority of a third host recall request after determining that the priority data in the third data structure indicating the priority of the second host recall request is lower priority than the priority of the third host recall request, wherein the first data structure further includes a flag field set by the second host system after the first host system releases the non-volatile storage device and after determining that the priority of the second host recall request is less than the priority indicated in the data structure, wherein the second host system retries the recall request after setting the flag field, and wherein the non-volatile storage device is allocated to the second host system to process the second host recall request after determining that the non-volatile storage device is available and that the flag is set.

17. An article of manufacture for use in programming multiple host systems to process recall requests directed to a non-volatile storage device, the article of manufacture comprising at least one computer readable non-volatile storage device including at least one computer program embedded therein that causes the host systems to perform the steps of:

allocating the non-volatile storage device to a first host system to process recall requests in a recall queue including a plurality of recall requests;

initiating a second host recall request with a second host system for data from the non-volatile storage device;

determining with the second host system whether the non-volatile storage device is allocated to the first host system;

storing priority data in a data structure with the second host system indicating a priority of the second host recall request after determining that the non-volatile storage device is allocated to the first host system;

retrying with the second host system the second host recall request at a later time; and using the stored priority data to determine whether to release the non-volatile storage device with the first host system before processing all the recall requests in the recall queue to make the non-volatile storage device available.

18. The article of manufacture of claim 17, wherein the step of the first host system releasing the non-volatile storage device occurs after the first host system determines that a next recall request in the recall queue has lower priority than the priority data the second host system stored in the data structure.

19. The article of manufacture of claim 17, further comprising the steps of:

determining with the second host system whether the non-volatile storage device is available and whether the priority of the second host recall request is greater than or equal to the priority data indicated in the data structure when retrying the second host recall request; and allocating he non-volatile storage device to the second host system to process the second host recall request after determining that the non-volatile storage device is available and that the priority of the second host call request is greater than or equal to the priority data indicated in the data structure.

20. The article of manufacture of claim 17, wherein the second host system stores the priority data in the data structure after comparing the priority data for the second host recall request with current priority data maintained in the data structure and determining that the priority of the second host recall request is higher than the current priority data maintained in the data structure.

21. The article of manufacture of claim 17, wherein the first host system releases the non-volatile stage device after processing recall request in the recall queue for a continuous period of time.

22. The article of manufacture of claim 17, wherein the later time the second host system retries the second host recall request is a first period of time, further comprising the step of the first host system attempting a recall request in the recall queue after a second period of time from when the first host system released the non-volatile storage device, wherein the first period of time is less than the second period of time to allow the allocation of the non-volatile storage device to the second host system before the first host system attempts the recall request in the recall queue that would use the subject tape.

23. The article of manufacture of claim 22, further comprising the steps of:
   determining with the second host system whether a priority of the attempted recall request from the recall queue is greater than the priority indicated in the data structure; and
   allocating the non-volatile storage device to the second host system to process the attempted recall request after determining that priority of the attempted recall request from the recall queue is greater than the priority indicated in the data structure.

24. The article of manufacture of claim 17, wherein the priority data includes a wait flag indicating whether an application program requesting the data that is the subject of the recall request needs the data in order to proceed, a priority value indicating a priority of the application program requesting the data, and a time stamp indicating when the recall request for the data was attempted, wherein the step of determining whether the priority data of a recall request is greater than or equal to the priority data stored in the data structure comprises the steps of determining whether the priority of the wait flag, priority value, and time stamp of the recall request is greater than or equal than that of the priority data stored in the data structure.

25. The article of manufacture of claim 17, further including the steps of:
   a third host system attempting a third host recall request before the second host system retries the second host real request and before the first host system releases the non-volatile storage device;
   storing priority data in the data structure with the third host system indicating a priority of the third host recall request after determining that the priority data in the data structure is lower priority than the priority of the third host recall request;
   setting a flag associated with the second host recall request alter determining that the priority of the second host recall request is less than the priority indicated in the data structure, wherein the flag is set when the non-volatile storage device is released;
   retrying the second host recall request after setting the flag, wherein the second host system retries the second host recall request before the third host system attempts to retry the third host recall request; and
   allocating the non-volatile storage device to the second host system to process the second host recall request after determining that the non-volatile storage device is available and that the flag is set.

26. The article of manufacture of claim 25, wherein the step of setting the flag further comprises setting a value associated with the flag that is identical to a value in the priority data maintained in the data structure, and wherein the step of allocating the non-volatile storage device occurs after determining that the non-volatile storage device is available, the flag is set, and the value associated with the flag is identical to the value in the priority data maintained in the data structure.

27. A plurality of memory locations for storing data for access by storage management programs being executed on multiple host systems capable of communicating with a non-volatile storage device, comprising:
   a first data structure defining a second host recall request initiated by a second host system for data stored in the non-volatile storage device, wherein the first data structure includes priority data indicating a priority of the second host recall request;
   a second data structure defining a queue of recall requests initiated by a first host system for the non-volatile storage device; and
   a third data structure indicating whether the non-volatile storage device is allocated to the first host system, wherein the second host system stores priority data in the third data structure indicating the priority of the second host recall request after determining that the non-volatile storage device is allocated to the first host system, wherein the second host system retries the second host recall request at a later time, and wherein the first host system processes the third data structure to determine whether to release the non-volatile storage device before processing further recall requests indicated in the second data structure.

28. The memory of claim 27, wherein a first memory location accessible to a storage management program being executed on the second host system stores the first data structure, wherein a second memory location accessible to a storage management program being executed on the first host system stores the second data structure, and wherein a third memory location accessible to storage management programs being executed on the first and second host systems stores the third data structure.

29. The memory of claim 27, wherein the second host system stores the priority data in the third data structure after comparing the priority data for the second host recall request with current priority data maintained in the third data structure and determining that the priority of the second host recall request is higher than the current priority data maintained in the third data structure.

30. The memory of claim 27, wherein the priority data in the first and third data structures further includes a wait flag indicating whether an application program requesting the data that is the subject of the recall request needs the data in order to proceed, a priority value indicating a priority of the application program requesting the data, and a time stamp indicating when the recall request for the data was generated, wherein the second host system determines whether the priority of a recall request indicated in the first data structure is greater than or equal to the priority indicated in the third data structure by determining whether the priority of the wait flag, priority value, and time stamp of the recall request as indicated in the first data structure is greater than or equal the wait flag, priority value, and time stamp priority data indicated in the third data structure.

31. The memory of claim 27, wherein a third host system stores priority data in the third data structure indicating a priority of a third host recall request after determining that the priority data in the third data structure indicating the priority of the second host recall request is lower priority the priority of the third host recall request, and wherein the first data structure further includes a flag field set by the second host system after the first host system releases the non-volatile storage device and after defining that the priority of the second host recall request is less than the priority indicated in the data structure, wherein the second host system retries the recall request after setting the flag field, and wherein the non-volatile storage device is allocated to the second host system to process the second host recall request after determining that the non-volatile storage device is available and that the flag is set.

32. The memory of claim 31, wherein the first data structure further includes a value associated with the flag that is set to a value in the priority data maintained in the third data structure, and wherein the step of allocating the non-volatile storage device occurs after determining that the non-volatile storage device is available, the flag is set, and that the value associated with the flag is identical to the value in the priority data maintained in the data structure.

* * * * *

UNITED STATES PATENT AND TRADEMARK OFFICE
CERTIFICATE OF CORRECTION

PATENT NO. : 6,272,605 B1
DATED : August 7, 2001
INVENTOR(S) : Cuong Minh Le and Jerry Wayne Pence It is certified that error appears in the above-identified patent and that said Letters Patent is hereby corrected as shown below:

Drawings,
Fig. 1, element 10, delete "Seconary" and insert -- Secondary --.

Column 11,
Line 35, delete "stop" and insert -- step --.

Column 12,
Line 43, delete "deter" and insert -- determining --.

Column 13,
Line 17, after "systems" insert -- , --.

Column 14,
Line 51, delete "he" and insert -- the --.
Line 65, delete "stage" and insert -- storage --.
Line 66, delete "request" and insert -- requests --.

Column 15,
Line 40, delete "real" and insert -- recall --.
Line 48, delete "alter" and insert -- after --.

Column 16,
Line 62, after "lower priority" insert -- than --.
Line 66, delete "defining" and insert -- determining --.

Signed and Sealed this

First Day of April, 2003

JAMES E. ROGAN
*Director of the United States Patent and Trademark Office*